(12) United States Patent
Sasaki (10) Patent No.: US 7,145,628 B2
(45) Date of Patent: Dec. 5, 2006

(54) METHOD FOR FABRICATING A LIQUID CRYSTAL PANEL COMPRISING SPACERS HAVING AN INITIAL SIZE LARGER THAN AN APPROPRIATE CELL GAP

(75) Inventor: Takeshi Sasaki, Tokyo (JP)

(73) Assignee: NEC LCD Techologies, Ltd. (JP)

( * ) Notice: Subject to any disclaimer, the term of this patent is extended or adjusted under 35 U.S.C. 154(b) by 0 days.

(21) Appl. No.: 09/855,148

(22) Filed: May 14, 2001

(65) Prior Publication Data

US 2001/0040667 A1    Nov. 15, 2001

(30) Foreign Application Priority Data

May 15, 2000    (JP)    ............... 2000-142491

(51) Int. Cl.
*G02F 1/1339*    (2006.01)
(52) U.S. Cl. ............... 349/190; 349/155; 349/153
(58) Field of Classification Search ............... 349/190, 349/155, 153
See application file for complete search history.

(56) References Cited

U.S. PATENT DOCUMENTS 5,231,527 A * 7/1993 Takanashi et al. ........ 349/155
6,086,443 A * 7/2000 Shin et al. ................ 445/25
6,100,958 A * 8/2000 Teraguchi et al. ........ 349/187
6,204,907 B1 * 3/2001 Hiraishi et al. ........... 349/155
6,674,503 B1 * 1/2004 Niiya et al. ............... 349/155

FOREIGN PATENT DOCUMENTS

| JP | 01-054420 | 3/1989 |
|---|---|---|
| JP | 02-123324 | 5/1990 |
| JP | 06-160865 | 6/1994 |
| JP | 08-304841 | 11/1996 |
| JP | 11-264987 | 9/1999 |

* cited by examiner

*Primary Examiner*—Dung T. Nguyen
*Assistant Examiner*—Thoi V. Duong
(74) *Attorney, Agent, or Firm*—Hayes Soloway P.C.

(57) ABSTRACT

In a fabrication method of an LCD panel having a display area on which display area spacers 6 are arranged and employing the liquid crystal falling-drop method for filling the panel with liquid crystal, the display area spacer 6 is formed of an elastic material such as resin and has an initial size in a cell gap direction larger than an appropriate cell gap $d_0$ necessary to provide an appropriate liquid crystal display. An excess deformation of the panel to make the cell gap smaller than the appropriate cell gap $d_0$ after the liquid crystal display panel is put under atmospheric pressure is prevented by compressive stress of the display area spacers 6.

7 Claims, 3 Drawing Sheets

METHOD FOR FABRICATING A LIQUID CRYSTAL PANEL COMPRISING SPACERS HAVING AN INITIAL SIZE LARGER THAN AN APPROPRIATE CELL GAP

BACKGROUND OF THE INVENTION

1. Field of the Invention

The present invention relates to a fabrication method of an LCD (Liquid Crystal Display) panel and, particularly to a fabrication method of an LCD panel having spacers dispersed on a display area thereof, in which liquid crystal falling-drop method for filling a gap of the LCD panel with liquid crystal is utilized.

2. Description of the Prior Art

In general, an LCD panel has a structure composed of a pair of opposing transparent substrates adhered to each other by a frame-shaped seal formed on a periphery of a display area thereof and liquid crystal filling a region of a gap between the substrates, which is surrounded by the seal. Furthermore, the LCD panel structure includes spacers (referred to as "seal spacers", hereinafter) mixed in the seal and spacers (referred to as "display area spacers", hereinafter) arranged in the display area, for maintaining a cell gap at an appropriate value.

In order to fill the gap between the substrates with liquid crystal, the fabrication method of the LCD panel includes either the liquid crystal injection method or the liquid crystal falling-drop method. In either the liquid crystal method or the liquid crystal falling-drop method, the rubbing step of printing an alignment film (polyimide film) and rubbing the alignment film to form grooves for aligning liquid crystal molecules is included after the patterning steps of an insulating film, which is necessary according to a liquid crystal display system employed, transparent electrode films, switching elements and a color filter layer, etc., which are formed on the transparent substrates. The liquid crystal injection method and the liquid crystal falling-drop method are different from each other in the assembling step subsequent to the rubbing step. The liquid crystal injection method and the liquid crystal falling-drop method will be described respectively.

Describing the assembling of the LCD panel in the liquid crystal injection method, the seal in the form of a closed line having an opening portion is formed around the display area on either one of the transparent substrates by a drawing printing using a dispenser or a screen printing, etc. And, the display area spacers are arranged on either one of the transparent substrates by forming them thereon or dispersing them. Thereafter, one of the transparent substrates is stuck on the other and the seal is hardened after the gap between the transparent substrates is regulated to a desired value while externally pressing the substrates. In this step, it is necessary to provide a desired cell gap. Thereafter, liquid crystal is injected into the gap between the transparent substrates through the opening portion of the seal as a liquid crystal injection port by usual vacuum injection method. Thereafter, the liquid crystal injection port is sealed by filling a sealing resin therein. According to the vacuum injection method, the LCD panel having the liquid crystal injection port is put in a vacuum device and, after the gap of the LCD panel is evacuated, the liquid crystal injection port is dipped in a liquid crystal tank filled with liquid crystal and liquid crystal is injected into the gap of the LCD panel while gradually increasing external pressure.

On the other hand, in the liquid crystal falling-drop method, the LCD panel is assembled through the steps mentioned below. The seal in the form of a closed line is formed around the display area on either one of the transparent substrates by a drawing printing using a dispenser or a screen printing, etc. And, the display area spacers are arranged on the transparent substrate by forming them or dispersing them. Thereafter, a suitable amount of liquid crystal is dropped onto the display area of the transparent substrate. Thereafter, one of the transparent substrates is stuck on the other and adhered each other in a vacuum chamber. Then, the mutually adhered transparent substrates are left under atmospheric pressure, so that the transparent substrates are deformed by a pressure corresponding to a difference between atmospheric pressure and a negative pressure within the LCD panel to reduce the gap between the transparent substrates. The seal is hardened at a time when a desired cell gap is obtained by such deformation of the transparent substrates.

In either the liquid crystal injection method or the liquid crystal falling-drop method, thermosetting resin or ultraviolet ray setting resin is mainly used as a material of the seal. Further, spherical or circular pillar shaped spacers are used as the seal spacers or the dispersed display area spacers. The display area spacers provided by forming them means the circular pillar shaped spacers formed by patterning.

When a plurality of LCD panels are formed with using a pair of large area transparent substrates, the transparent substrates are cut apart to form incomplete LCD panels and complete LCD panels are obtained by attaching polarizers onto front and rear surfaces of the incomplete LCD panels, respectively, in the final step of either the liquid crystal injection method or the liquid crystal falling-drop method.

In the fabrication method of the LCD panel using the conventional liquid crystal falling-drop method, a problem occurs during a period from a time when the incomplete LCD panel including the mutually adhered transparent substrates is left in atmospheric condition to a time the seal is hardened.

The problem of the fabrication method of liquid crystal display using the liquid crystal falling-drop method will be described with reference to a TFT driven, color LCD panel as an example.

Figure 1A:
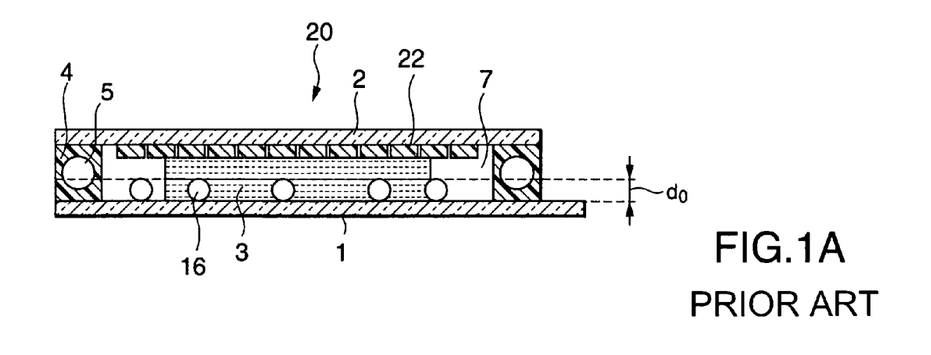
FIG. 1A to FIG. 1C are cross sections of an LCD panel illustrating main fabrication steps of a conventional fabrication method.
Figure 1B:
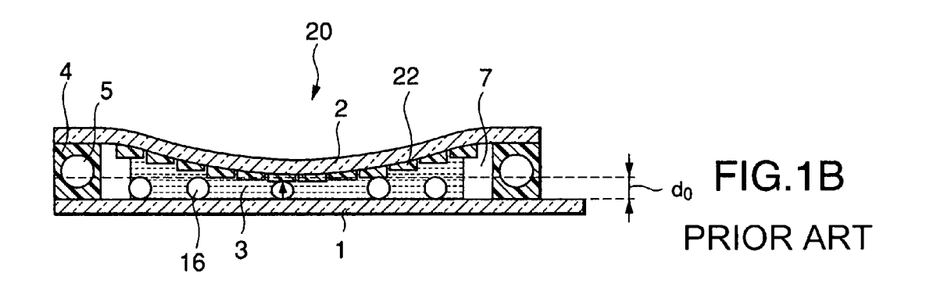
Figure 1C:
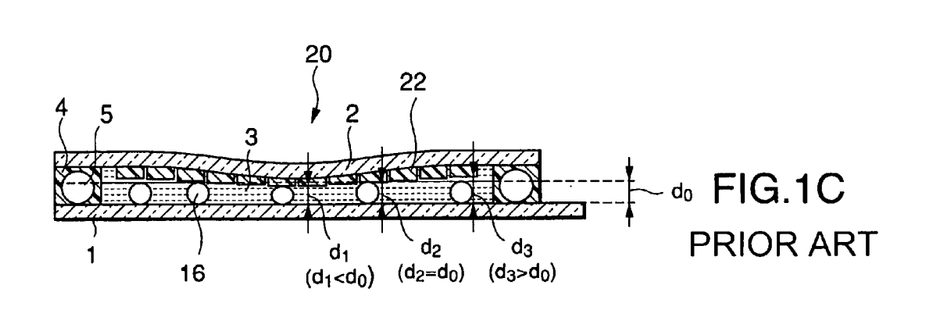

FIG. 1A to FIG. 1C show cross sections of a LCD panel 20 fabricated by the conventional method. The LCD panel 20 is the TFT driven, color LCD. As shown in FIG. 1A to FIG. 1C, the LCD panel 20 is constructed with, mainly, a TFT substrate 1, a CF (Color Filter) substrate 2 opposing to the TFT substrate 1, liquid crystal 3 provided between the TFT substrate 1 and the CF substrate 2, a seal 4 for mutually adhering the TFT substrate 1 and the CF substrate 2 and sealing the liquid crystal 3, seal spacers incorporated in the seal 4 and display area spacers 16 arranged on a display area surrounded by the seal on the TFT substrate 1. The CF substrate 2 is provided with red, green and blue filter layers 22. An initial average size of the display area spacers 16 in a cell gap direction is set to a value equal to an appropriate cell gap value d0, which is necessary to perform a liquid crystal display appropriately. When the display area spacer is spherical or circular pillar shaped, the size thereof in the cell gap direction corresponds to a diameter thereof or, when it is a square pillar shaped spacer, the size corresponds to a side length of a square cross section thereof.

FIG. 1A shows a cross section of an incomplete LCD panel formed by dropping liquid crystal 3 on the TFT substrate 1 having the seal 4 and the display area spacers 16 arranged thereon and adhering the transparent TFT substrate 1 and the transparent CF substrate 2 together in a vacuum chamber immediately after the incomplete LCD panel is put in atmospheric environment. In this state, an inside pressure of the incomplete LCD panel 20 is negative, that is, lower than atmospheric pressure, and liquid crystal 3 does not fill in the incomplete LCD panel 20 completely as yet, leaving an empty portion 7. Thereafter, the incomplete LCD panel 20 is deformed due to the difference between atmospheric pressure and negative pressure inside the panel 20, so that a distance between the TFT substrate 1 and the CF substrate 2 is reduced. Since, in FIG. 1A, the TFT substrate 1 is put on a horizontal plane, the CF substrate 2 put on the TFT substrate 1 is deformed. Liquid crystal 3 is pressed by this deformation of the CF substrate 2 and gradually spread radially outward in parallel to the plane, so that the empty portion 7 is reduced.

However, the deformation of the incomplete LCD panel proceeds in a center portion of the LCD panel at higher speed than that in a peripheral portion as shown in FIG. 1B because, although atmospheric pressure exerted on the CF substrate is uniform, viscosity of liquid crystal 3 is very small compared with viscosity of the seal 4. That is, a resistance of liquid crystal 3 against the CF substrate 2 is small compared with a resistance of liquid crystal 3 against the seal 4. Viscosity of liquid crystal 3 is in the order of 0.02 (Pa·s) and viscosity of an adhesive resin used as the seal 4 is in the order of several tens to several hundreds (Pa·s).

Since the deformation of the incomplete LCD panel 20 proceeds in the center portion thereof at higher speed than that of the peripheral portion thereof, an inner surface of the CF substrate 2 first reaches the display area spacers 16 arranged in the center portion. The deformation further continues and, when the CF substrate 2 presses the display area spacers 16, the deformation of the CF substrate 2 is restricted by the resistance of the display area spacers 16. FIG. 1B shows this state. In the state shown in FIG. 1B, the display area spacers 16 arranged in the center portion of the LCD panel is pressed down and, therefore, the cell gap in the center portion of the LCD panel is smaller than the appropriate cell gap d0. This is because the initial size of the display area spacer 16 before compressed is set to the value equal to the appropriate cell gap d0.

Furthermore, since, in the state shown in FIG. 1B, there is the empty portion 7 left and pressures inside and outside of the panel are not equilibrated, that is, the inner pressure of the panel is different from atmospheric pressure, the deformation still further proceeds. This deformation of the CF substrate 2 proceeds in only the peripheral portion since the progression of deformation of the center portion is restricted by the resistance of the display area spacers 16 against the TFT substrate 1 and the CF substrate 2.

Thereafter, the deformation of the peripheral portion of the LCD panel proceeds until the LCD panel 20 becomes in the state shown in FIG. 1C in which the progression of deformation of the LCD panel 20 is stopped. FIG. 1C shows the state in which the empty portion 7 in the LCD panel 20 disappears due to the progression of deformation in the peripheral portion of the CF substrate, so that the inner volume of the panel 20 becomes equal to the volume of liquid crystal 3, achieving the pressure equilibrium between the inside and the outside of the panel.

In the state shown in FIG. 1C, the inner surface of the CF substrate 2 is not in contact with the seal spacers 5. That is, the seal spacers 5 are not pinched between the TFT substrate 1 and the CF substrate 2 and their spacer function to maintain the gap between the TFT substrate 1 and the CF substrate 2 at the appropriate value is not achieved enough, so that the peripheral portion of the LCD panel does not become the same as the appropriate cell gap.

Therefore, the cell gap value d1 of the center portion of the LCD panel 20 is smaller than the appropriate cell gap d0 (d1<d0) and the cell gap value d3 of the peripheral portion thereof is lager than the appropriate cell gap d0 (d3>d0), so that, between the center portion and the peripheral portion of the LCD panel, there is a portion in which the appropriate cell gap value is obtained as shown in FIG. 1C.

The reason for the pressure equilibrium between inside and outside of the LCD panel and the stoppage of progression of deformation in the state in which the cell gap is not uniform as mentioned above is that the amount of liquid crystal 3 is set to a value equal to the inside volume of the LCD panel 20 in the state in which the cell gap is equal to the appropriate cell gap d0 throughout the LCD panel. That is, a portion of liquid crystal 3 in the center portion of the LCD panel, which is compressed due to the reduced cell gap d1, is pushed into the peripheral portion, so that the cell gap d3 in the peripheral portion of the LCD panel becomes larger than the appropriate cell gap d0.

The state shown in FIG. 1C is a metastable state and sustained for some time period. If the hardening of the seal 4 were suspended for a considerably long time, the LCD panel 20 could be deformed in a manner that the cell gap becomes uniform throughout the LCD panel 20 due to the resistance of the display area spacers 16 in the center portion of the LCD panel 20. However, when the seal 4 is left in unhardened state for a too long time period under atmospheric pressure, there may be a case where the seal 4 is broken because pressure is directly applied to the seal 4 from the time when the LCD panel 20 is put under atmospheric pressure. Therefore, a time period from the time when the LCD panel is put in atmospheric pressure to the hardening time of the seal 4 is preferably from several minutes to several tens minutes. For this reason, the seal 4 has to be hardened under the condition in which the cell gap in the center portion of the LCD panel is smaller than the appropriate cell gap and that in the peripheral portion is larger than the appropriate cell gap, as shown in FIG. 1C.

Figure 2:
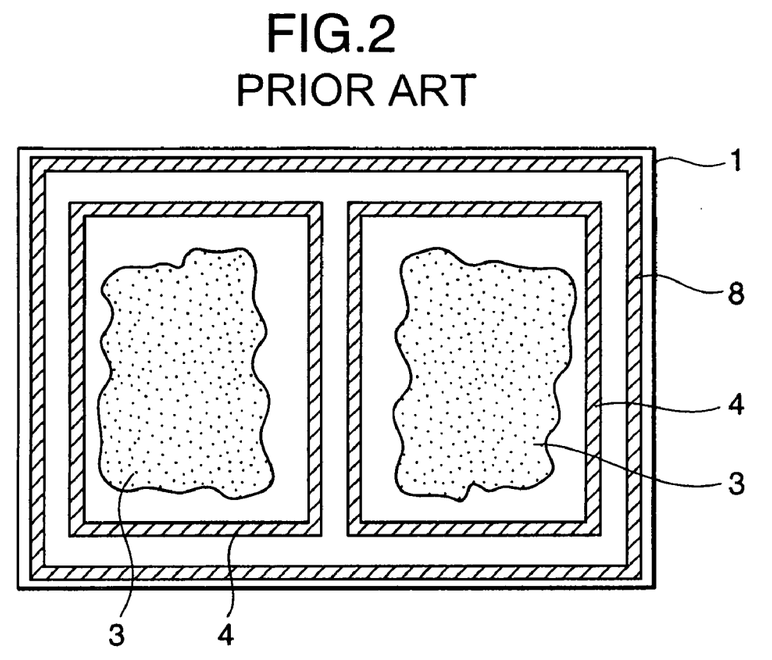
FIG. 2 is a schematic plan view showing a TFT substrate after a seal printing and a liquid crystal dropping are performed for a case where a plurality of LCD panels are fabricated simultaneously.

The pressure acting on the seal 4 will be described with FIG. 2 which is a plan view of the TFT substrate including a pair of areas, which finally become two LCD panels, after the printing of the seals 4 and the dropping of liquid crystal 3 are performed therefor. In order to enhance the pressing force of atmospheric pressure to the transparent substrates after the latters are adhered each other, there is a case where an arbitrary seal 8 surrounding the seals 4 is formed as shown in FIG. 2. The auxiliary seal 8 is used to form a vacuum space surrounding the seals 4 and maintaining the enhanced pressing force.

Since the inner pressure of the seals 4 is increased with the progression of the above-described deformation of the LCD panels, the increased inner pressure is exerted on inner peripheral faces of the seals 4.

When the arbitrary seal 8 is broken by atmospheric pressure, the latter pressure is exerted on the outer peripheral faces of the seals 4. According to the fabrication method without using the arbitrary seal 8, atmospheric pressure is, of course, exerted on the outer peripheral faces of the seals 4 from a time at which the panel is put under atmospheric pressure.

In the liquid crystal injection method, liquid crystal is injected to the space surrounded by the seal through the opening portion thereof after the LCD panel is assembled by adhering the transparent substrates each other and hardening the seal therebetween, as mentioned previously. Therefore, even when the cell gap is smaller than the appropriate cell gap at the assembling time, it is possible to restore the appropriate cell gap by the resilient force of the spacers in the liquid crystal injecting step, since the seal has the opening portion. On the other hand, in the liquid crystal falling-drop method, the cell gap is formed in the state where liquid crystal is sealed by the seal and, therefore, once the non-uniform cell gap is formed, it is difficult to restore the appropriate cell gap.

As described above, in the fabrication method of a LCD panel using the conventional liquid crystal falling-drop method, the cell gap of the LCD panel obtained becomes non-uniform since the cell gap in the center portion of the LCD panel is smaller and the cell gap in the peripheral portion is larger compared with the appropriate cell gap. Since, therefore, the display area spacers arranged in the peripheral portion of the LCD panel do not support the substrates, the LCD panel may be easily deformed by external pressure and/or its weight, so that the uniformity of cell gap of the LCD panel can not be obtained. Moreover, since liquid crystal expands or contracts by variation of temperature and the amount of change of the cell gap in the center portion and in the peripheral portion is different, the display condition in the center portion of the LCD panel and in the peripheral portion thereof becomes different.

As a result of these matters, the display quality of the LCD panel is degraded.

SUMMARY OF THE INVENTION

The present invention was made in view of the above described problem of the conventional fabrication method of an LCD panel and has an object to provide a fabrication method for fabricating an LCD panel with using the liquid crystal falling-drop method, the LCD panel having a display area in which spacers are arranged and having an appropriate cell gap throughout the display area thereof to provide a high display quality, by avoiding inconvenience caused by partial difference in deformation of the LCD panel due to difference in viscosity between liquid crystal and a seal for sealing the display area.

According to a first aspect of the present invention, the fabrication method using the liquid crystal falling-drop method is featured by that spacers each having an initial size in a cell gap direction larger than an appropriate cell gap necessary to perform a liquid crystal display appropriately are used between the transparent substrates.

In detail, in fabricating an LCD panel constructed with a pair of mutually opposing transparent substrates mutually adhered by a seal and liquid crystal filling a space between the transparent substrates and sealed by the seal, through the steps of forming the seal on one of the transparent substrates such that the display area thereof is surrounded by the seal, arranging spacers on the display area of one of the transparent substrates, dropping liquid crystal onto an area inside the display area surrounded by the seal on the transparent substrate, sticking one of the transparent substrates on the other through the seal in a vacuum chamber to form a panel, putting the panel under an atmospheric pressure to deform the panel until an inner volume of the cell gap of the LCD panel becomes equal to a volume of liquid crystal and hardening the seal, the present invention is featured by that the spacers each has an initial size in a cell gap direction larger than an appropriate cell gap suitable to make a liquid crystal display appropriate.

The term "initial size" of the spacer, used in this specification, means a size of the spacer in a free state without any compressive load, etc., thereon and, when the size of the spacers varies, the term means an average size of the spacers in the free state.

Since the display area spacers having initial size or initial average size in the cell gap direction larger than the appropriate cell gap suitable for realizing an appropriate liquid crystal display are used in the present invention, it is possible to prevent the spacers from being excessively collapsed to a size smaller than the appropriate cell gap due to atmospheric pressure exerted on the LCD panel, unlike the conventional spacers having initial size or initial average size equal to the appropriate cell gap. Therefore, according to the present invention, the problem of non-uniformity of cell gap that the cell gap in the center portion of the LCD panel is smaller than the appropriate cell gap and the cell gap in the peripheral portion is larger than the appropriate cell gap at a time when the inner volume of the LCD panel becomes equal to the volume of liquid crystal therein and the deformation of the LCD panel becomes in a metastable state is solved.

Furthermore, since, in the present invention, the amount of liquid crystal in the LCD panel is set to a value equal to the inner volume of the LCD panel in the state where the cell gap becomes the appropriate cell gap throughout the display area of the LCD panel, as in the conventional method, it is possible to obtain the LCD panel having uniform appropriate cell gap throughout the display area thereof and providing high display quality.

Moreover, since the display area spacers having initial size or initial average size in the cell gap direction larger than the appropriate cell gap suitable for performing an appropriate liquid crystal display are used, the display area spacers in the display area are pressed between the transparent substrates to perform their function of restricting the cell gap to the appropriate value. As a result, the display area spacers improve and maintain the uniformity of cell gap of the LCD panel.

As will be clear from the foregoing description, spacers, which are not compressed to the appropriate cell gap by atmospheric pressure exerted on the LCD panel, for example, spacers having initial size, which is too large compared with the appropriate cell gap or spacers, which are of a hard material and are substantially not deformed although the size is a little larger than the appropriate cell gap, are not used in the present invention as the display area spacers, since the seal is hardened after the inner volume of the LCD panel becomes equal to the volume of liquid crystal. If such too large spacers or too hard spacers were used as the display area spacers, there should be voids left in the panel and the inner volume of the panel does not become equal to the volume of liquid crystal in the LCD panel. That is, in the present invention, the conditions of the display area spacer are set such that it can be compressed up to the appropriate cell gap by deformation under atmospheric pressure exerted on the panel.

According to a second aspect of the present invention, the fabrication method of an LCD panel is featured by that, in the fabrication method according to the first aspect of the present invention, spacers, which are elastically deformed from the initial size or the initial average size to the appropriate cell gap, are used as the display area spacers.

Therefore, there is a merit that it is easy to realize the deformation of the display area spacers from its initial size to the appropriate cell gap under atmospheric pressure.

Since the display area spacers of the LCD panel fabricated by this method are pinched between the transparent substrates in the state where the panel is deformed at room temperature, there is another merit that the appropriate cell gap is maintained throughout the display area for a long time period. This is because the deformability of the whole panel against external force becomes lowered due to compression stress (resistive force) of the display area spacers acting on the whole panel. If the display area spacers were not pinched between the transparent substrates, there should be a possibility of movement of the display area spacers within the panel after the LCD panel is completed. With such movement of the display area spacers, the display area spacers may be unevenly distributed and the function of the display area spacers for maintaining the cell gap may be lost, resulting in that the cell gap becomes non-uniform.

It is preferable that spacers made of a resin material are used as the display area spacers, which are to be elastically deformed from the initial size to the appropriate cell gap.

According to a third aspect of the present invention, the fabrication method of an LCD panel according to the first or second aspect is featured by that spacers of material, which is substantially not deformed when the spacers are pinched between the transparent substrates under atmospheric pressure, are mixed in the seal.

Therefore, since, in the fabrication method of the LCD panel according to the third aspect of the present invention, there is a merit that the cell gap between the transparent substrates in the seal portion of the LCD panel can be maintained at constant with high precision.

The size of the seal spacers in the cell gap direction in a state the seal spacers are pinched between the transparent substrates is set to a value with which the cell gap in the display area becomes the appropriate cell gap. The relative value of the initial average size of the seal spacers to the appropriate cell gap value is preferably in a range from a value larger than 102.9% to a value smaller than 107.0%. More preferably, the relative value is (105±2) %.

Furthermore, the material of the seal spacers, which is substantially not deformed when pinched between the substrates under atmospheric pressure, is preferably a hard material such as glass or silica, etc.

DETAILED DESCRIPTION OF THE PREFERRED EMBODIMENTS

A fabrication method of an LCD panel, according to an embodiment of the present invention, will be described with reference to a TFT driven, color LCD panel as an example. It should be noted, however, that the present invention is not limited to this embodiment.

Figure 3A:
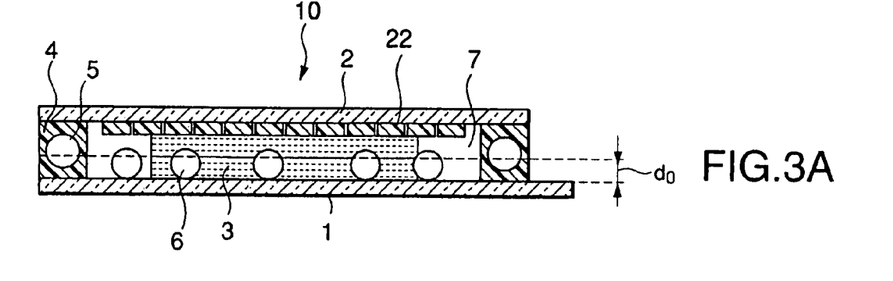
FIG. 3A to FIG. 3C are cross sections of an LCD panel illustrating main fabrication steps of a fabrication method of an LCD panel according to the present invention.
Figure 3B:
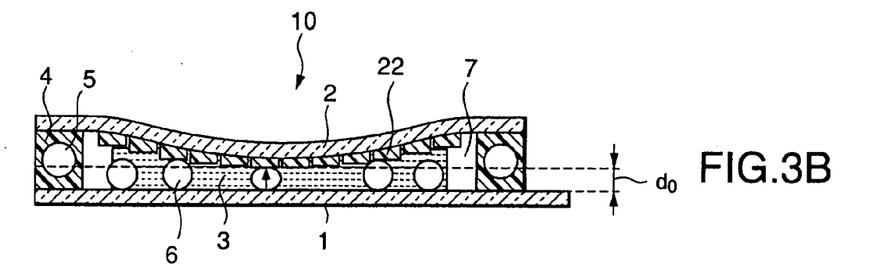
Figure 3C:
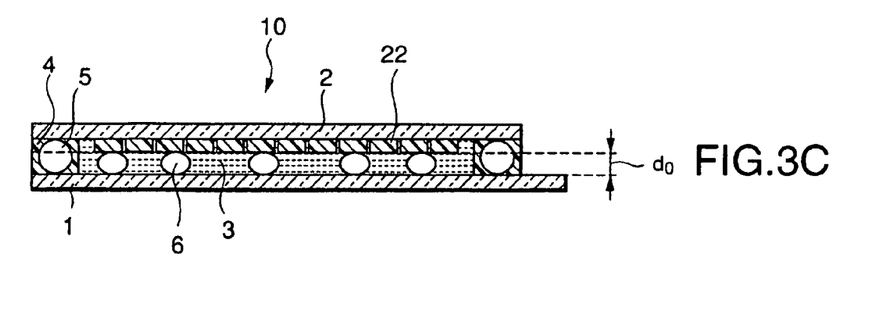

FIG. 3A to FIG. 3C are cross sections of an LCD panel 10 illustrating the fabrication steps of the present fabrication method. The LCD panel 10 is a TFT driven, color LCD panel. As shown in FIG. 3A to FIG. 3C, the LCD panel 10 is constructed with, mainly, a TFT substrate 1, a CF substrate 2 opposing to the TFT substrate 1, liquid crystal 3 filling a gap between the TFT substrate 1 and the CF substrate 2, a seal 4 for adhering the TFT substrate 1 to the CF substrate 2 and sealing liquid crystal 3 between, the TFT and CF substrates, seal spacers incorporated in the seal 4 and display area spacers 6 arranged on a display area of the LCD panel.

The initial average size of the display area spacers 6 in a cell gap direction is set to a value larger than an appropriate cell gap value d0 necessary to appropriately perform a liquid crystal display. When the display area spacer is spherical or circular pillar shaped, the size thereof in the cell gap direction corresponds to a diameter of the spacer and, when the display area spacer is square pillar shaped, the size thereof corresponds to a length of one side of a cross section thereof.

Conditions of the display area spacer 6 are set such that the display area spacer 6 is deformable such that its height is reduced up to a value corresponding to the appropriate cell gap under atmospheric pressure exerted on the LCD panel 10.

These conditions of the display area spacer depend upon physical nature thereof (spacer size (height, cross sectional area, etc.)), dynamic nature thereof (elasticity, plasticity, etc.), the number of display area spacers in a unit area on the transparent substrate (density of spacer on the transparent substrate), viscosity of the seal material and viscosity of liquid crystal, etc. Therefore, the conditions are obtained preliminarily by calculations and/or experiments.

In this embodiment, resin spacers are used as the display area spacers 6, which can be elastically deformed from the initial size to the value corresponding to the appropriate cell gap d0.

Furthermore, in this embodiment, glass spacers are used as the seal spacers 5, which are substantially not deformed even when they are pinched between the TFT substrate 1 and the CF substrate 2 under atmospheric pressure.

FIG. 3A shows a cross section of an incomplete LCD panel formed by dropping liquid crystal 3 on the TFT substrate 1 having the seal 4 and the display area spacers 6 arranged in a display area surrounded by the seal 4 and adhering the TFT substrate 1 and the CF substrate 2 together in a vacuum chamber, in a state immediately after the incomplete LCD panel is put in atmospheric environment. In this state, an inner pressure of the incomplete LCD panel 10 is low (negative) and liquid crystal 3 does not fill in the incomplete LCD panel 10 completely as yet, leaving an empty portion 7. Thereafter, the incomplete LCD panel 10 is deformed due to a difference between atmospheric pressure and negative pressure inside the panel 10, so that a distance between the TFT substrate 1 and the CF substrate 2 is reduced. Since, in FIG. 3A, the TFT substrate 1 is put on a horizontal plane and the CF substrate 2 is stuck thereon, the CF substrate 2 put on the TFT substrate 1 is deformed or changed. Liquid crystal 3 is pressed by this deformation or change and gradually spread radially outward in the LCD panel, so that the empty portion 7 is reduced.

However, the deformation of the incomplete LCD panel 10 proceeds in a center portion at higher speed than that in a peripheral portion as shown in FIG. 3B. This is because, although atmospheric pressure exerted on the substrate is uniform, viscosity of liquid crystal 3 is very small compared with viscosity of the material of the seal 4. That is, a resistance of liquid crystal 3 against the CF substrate 2 is small compared with a resistance of liquid crystal 3 against the seal 4. Viscosity of liquid crystal 3 is in the order of 0.02 (Pa·s) and viscosity of an adhesive resin used as the seal 4 is in the order of several tens to several hundreds (Pa·s).

Since the deformation of the incomplete LCD panel 10 proceeds in the center portion at higher speed than that of the peripheral portion, an inner surface of the CF substrate 2 first reaches the display area spacers 6 arranged in the center portion. The deformation further continues and, when the CF substrate 2 presses the display area spacers 6, the deformation of the CF substrate 2 is restricted by the resistance of the display area spacers 6. FIG. 3B shows this state. In the state shown in FIG. 3B, the display area spacers 6 arranged in the center portion are pressed down and, therefore, the cell gap in the center portion becomes substantially equal to the appropriate cell gap d0. This is because the conditions of the display area spacer are set such that the initial average size of the display area spacers 6 is set to the value larger than the appropriate cell gap d0 so that the display area spacers 6 can be deformed up to the appropriate cell gap under atmospheric pressure exerted on the LCD panel 10. Moreover, even if the cell gap in the center portion of the LCD panel becomes a value smaller than the appropriate cell gap d0 thereof, the cell gap value does not become the minimum cell gap when the display area spacers having initial size in the cell gap direction equal to the appropriate cell gap are used, so that it is possible to limit the minimum cell gap to a value close to the appropriate cell gap d0.

Since, in the state shown in FIG. 3B, there is the empty portion 7 left as it is and pressures inside and outside of the LCD panel are not equilibrated, the deformation of the LCD panel still further proceeds. This deformation proceeds in only the peripheral portion because the progression of deformation of the center portion is restricted by the resistance of the display area spacers 6 against the TFT substrate 1 and the CF substrate 2.

Thereafter, the deformation of the peripheral portion of the LCD panel 10 proceeds to the state shown in FIG. 3C in which the progression of deformation of the peripheral portion of the LCD panel 10 is limited by the seal spacers 5. The state shown in FIG. 3C corresponds to a state in which the deformation of the peripheral portion of the LCD panel 10 proceeds until the inner surface of the CF substrate 2 becomes in contact with the seal spacers 5. Since the glass seal spacers 5 are substantially not deformed, the gap between the TFT substrate 1 and the CF substrate 2 can be maintained constant precisely.

In the state shown in FIG. 3C, the display area spacers 6 arranged in the peripheral portion are pinched between the TFT substrate 1 and the CF substrate 2 and deformed to a value substantially corresponding to the appropriate cell gap d0. That is, the cell gap in the peripheral portion becomes substantially equal to the appropriate cell gap d0.

Since the inner pressure of the LCD panel 10 is increased by reduction of thickness of liquid crystal 3 existing in the peripheral portion of the LCD panel, the cell gap value in the center portion is restored to the appropriate cell gap even when the cell gap in the center portion becomes to a value smaller than the appropriate cell gap d0 of the LCD panel 10 in the state shown in FIG. 3B.

Even when there are portions having the cell gap slightly larger than the appropriate cell gap d0, fine voids (not shown) exist in the LCD panel 10 and the inner pressure of the LCD panel 10 is not equal to atmospheric pressure as yet since the amount of liquid crystal 3 is set equal to the inner volume of the LCD panel 10 in the state where the cell gap becomes equal to the appropriate cell gap d0 throughout the display area. That is, since the inside of the panel 10 is in negative pressure, the LCD panel 10 is gradually deformed toward the appropriate cell gap d0 until the inner volume of the LCD panel 10 becomes equal to the volume of liquid crystal 3 throughout the display area.

As a result, liquid crystal 3 spreads over the whole area of the LCD panel 10 with uniform thickness, the voids disappear and the inner and outer pressures of the LCD panel 10 equilibrates, resulting in the LCD panel 10 having the appropriate cell gap d0 throughout the display area thereof. According to this LCD panel 10, it is possible to obtain a high display quality.

Thereafter, the seal 4 is hardened. When an ultraviolet ray setting adhesive is used as the seal 4, the seal 4 can be hardened by irradiating it with ultraviolet ray. When a thermosetting adhesive is used as the seal 4, the latter can be hardened by heating it to about 120° C. for one hour or longer.

Thereafter, the incomplete LCD panel is cut apart to respective LCD panels and complete LCD panels are obtained by forming polarizers, etc., on front and rear surfaces of the respective incomplete LCD panels.

The problem of the conventional method that the inner surface of the CF substrate 2 is not in contact with the seal spacers 5 having initial size equal to an appropriate cell gap in the cell gap direction and the seal spacers does not function as spacers, is solved by the present invention. That is, in the present invention, the seal spacers 5 are pinched between the TFT substrate 1 and the CF substrate 2 and function to maintain the gap between the TFT substrate 1 and the CF substrate 2 at an appropriate value.

Since the inner surface of the CF substrate 2 is in pressure contact with the display area spacers 6 arranged in the peripheral portion of the display area, the display area spacers 6 function to maintain the gap between the TFT substrate 1 and the CF substrate 2 at an appropriate value.

Experiments

Experiments conducted by the inventors of the present invention in order to determine the conditions of the display area spacer 6 for compressing the display area spacers 6 to deform the size to a size corresponding to the appropriate cell gap under atmospheric pressure exerted on the LCD panel 10 to thereby obtain the appropriate cell gap throughout the display area will be described.

[Content of the Experiments]

Spherical display area spacers 6 having diameter, that is, the initial average size, of 6.0 µm were dispersed on the display area of the LCD panel and the appropriate cell gap d0 was controlled according to the amount of liquid crystal 3. The relative value of the initial average size of the display area spacers to the appropriate cell gap (6.0/d0) was calculated. The state of the obtained LCD panels was tested.

[Conditions of the Experiments]

Conditions of the experiment are as follows:

(Condition 1)

The conditions used in the embodiment and described previously were used.

(Condition 2)

The auxiliary seal 8 shown in FIG. 2 was used.

(Condition 3)

The display area spacers 6 each was spherical and was formed of divinylbenzene copolymer resin. Diameter of the display area spacer 6 was 6.0 µm and the dispersing density of the display area spacers in the display area was 200 to 250/mm$^2$.

(Condition 4)

A ultraviolet ray setting adhesive was used as the material of both the seal 4 and the auxiliary seal 8 and viscosity of the ultraviolet ray setting adhesive was about 300 (Pa·s).

(Condition 5)

The seal spacers 5 each was spherical and formed of a glass material. The diameter of the seal spacer 5 was 6.5 μm.

(Condition 6)

Viscosity of liquid crystal 3 was 0.018 to 0.02 (Pa·s).

[Result and Verification of the Experiments]

Result of the experiments and verification thereof will be described below.

(i) (d0, 6.0/d0)=(5.99, 100.2%)

The seal 4 was pressed outward in the LCD panel 10 and a portion of the seal 4 was broken. Liquid crystal 3 leaked out to an area between the seal 4 and the auxiliary seal 8. This was due to that the initial size of the display area spacer 6 was small with respect to the appropriate cell gap d0. It is necessary to increase the initial size of the display area spacer 6 relatively.

(ii) (d0, 6.0/d0)=(5.83, 102.9%)

Cracks appeared in the outer peripheral surface of the seal 4. This was because the seal 4 was pressed outward in the LCD panel 10. It is necessary to increase the initial size of the display area spacer 6 relatively.

(iii) (d0, 6.0/d0)=(5.72, 104.9%)

No special defect was found.

(iv) (d0, 6.0/d0)=(5.61, 107.0%)

The cell gap was varied. This was because the initial size of the display area spacer 6 is slightly larger than the appropriate cell gap d0. It is necessary to reduce the initial size of the display area spacer 6.

From the above-mentioned result and the verification, it is estimated that the optimum value of the relative value of the initial average size of the display area spacer 6 with respect to the appropriate cell gap d0 is in a range from a value larger than 102.9% to a value smaller than 107.0%, preferably (105±2) %. More preferably, the optimum value of the relative value of the initial average size of the display area spacer 6 with respect to the appropriate cell gap is in the order of 105%. This tendency is substantially the same regardless of viscosity of the seal.

From the above-mentioned result of the experiments, it is possible to determine the conditions to be set in order to deform the display area spacers 6 to the appropriate cell gap under atmospheric pressure exerted on the LCD panel 10 to thereby obtain the appropriate cell gap throughout the display area.

As described hereinbefore, according to the present invention, which uses the display area spacers having an initial average size in the cell gap direction larger than the appropriate cell gap required to perform a liquid crystal display appropriately, it is possible to solve the problem of non-uniformity of the cell gap to thereby provide an LCD panel having the appropriate cell gap throughout the display area thereof and capable of providing a high display quality.

Since the display area spacers of the LCD panel fabricated according to the present method are pinched between the TFT substrate and the CF substrate in a state in which the display area spacers are compressed at room temperature, deformation of the whole panel hardly occurs due to the presence of the compressive stress (resistance force) of the display area spacers. Therefore, the appropriate cell gap can be maintained throughout the display area of the LCD panel for a long period of time.

What is claimed is:

1. A method for fabricating a liquid crystal display panel by the liquid crystal falling drop method, comprising the steps of:

forming a deformable seal member on at least one of a pair of opposing transparent substrates such that said seal member surrounds a display area of said liquid crystal display panel;

arranging first spacers on said display area on said substrate, said first spacer having an initial size in a cell gap direction larger than an appropriate cell gap necessary to fabricate an appropriate liquid crystal display;

dropping a volume of liquid crystal onto an area surrounded by said seal member on one of said transparent substrates;

forming a panel by sticking one of said transparent substrates on the other with said seal member in a vacuum chamber;

putting said panel under atmospheric pressure to deform said first spacers through a deformation of said panel due to a difference between said atmosphere pressure and a negative pressure inside said panel; and hardening said seal member after an inner volume of said panel becomes equal to the volume of said liquid crystal, wherein at least one of said first spacers is elastically deformed from an initial size thereof to a size corresponding to said appropriate cell gap before said seal member is deformed, and wherein a relative value of an initial average size of said first spacers to said appropriate cell gap is within a range of 102.9% to 107.0%.

2. A method for fabricating a liquid crystal display panel, as claimed in claim 1, wherein said seal member contains second spacers mixed therein, said second spacers being formed of a material, which is hardly deformed when it is pinched between said transparent substrates under atmospheric pressure.

3. A method for fabricating a liquid crystal display panel, as claimed in claim 1, wherein said first spacers are deformed to the size corresponding to said appropriate cell gap.

4. A method for fabricating a liquid crystal display panel, as claimed in claim 1, wherein the relative value is (105±2) %.

5. A method for fabricating a liquid crystal display panel by the liquid crystal falling drop method, comprising the steps of:

forming a deformable seal member on at least one of a pair of opposing transparent substrates such that said seal member surrounds a display area of said liquid crystal display panel;

arranging first spacers on said display area on said substrate, said first spacers having an initial size in a cell gap direction larger than an appropriate cell gap necessary to fabricate an appropriate liquid crystal display;

dropping a volume liquid crystal onto an area surrounded by said seal member on one of said transparent substrates;

forming a panel by sticking one of said transparent substrates on the other with said seal member in a vacuum chamber;

putting said panel under atmospheric pressure to deform said first spacers through a deformation of said panel without hardening said seal member, wherein excessive deformation of said panel due to atmospheric pressure is prevented by compressive stress of spacers located at a central region of said panel; and hardening said seal member after an inner volume of said panel becomes equal to the volume of said liquid crystal, wherein at least one of said first spacers are elastically deformed from an initial size thereof to a size corresponding to said appropriate cell gap before said seal member is deformed and said seal member contains second spacers mixed therein, said second spacers being formed of a material, which is hardly deformed when it is pinched between said transparent substrates under atmospheric pressure, and wherein a relative value of an initial average size of said first spacers to said appropriate cell gap is within a range of 102.9% to 107.0%.

6. A method for fabricating a liquid crystal display panel by the liquid crystal falling drop method, comprising the steps of:

forming a deformable seal member on at least one of a pair of opposing transparent substrates such that said seal member surrounds a display area of said liquid crystal display panel;

arranging first spacers on said display area on said substrate, said first spacer having an initial size in a cell gap direction larger than an appropriate cell gap necessary to fabricate an appropriate liquid crystal display;

dropping a volume liquid crystal onto an area surrounded by said seal member on one of said transparent substrates;

forming a panel by sticking one of said transparent substrates on the other with said seal member in a vacuum chamber;

putting said panel under atmospheric pressure to deform said first spacers through a deformation of said panel without hardening said seal member, wherein excessive deformation of said panel due to atmospheric pressure is prevented by compressive stress of spacers located at a central region of said panel; and hardening said seal member after an inner volume of said panel becomes equal to the volume of said liquid crystal, wherein at least one of said first spacers is elastically deformed from an initial size thereof to a size corresponding to said appropriate cell gap before said seal member is deformed and said first spacer is deformed to the size corresponding to said appropriate cell gap, and wherein a relative value of an initial average size of said first spacers to said appropriate cell gap is within a range of 102.9% to 107.0%.

7. A method for fabricating a liquid crystal display panel by the liquid crystal falling drop method, comprising the steps of:

forming a deformable seal member on at least one of a pair of opposing transparent substrates such that said seal member surrounds a display area of said liquid crystal display panel;

arranging first spacers on said display area on said substrate, said first spacer having an initial size in a cell gap direction larger than an appropriate cell gap necessary to fabricate an appropriate liquid crystal display;

dropping a volume liquid crystal onto an area surrounded by said seal member on one of said transparent substrates;

forming a panel by sticking one of said transparent substrates on the other with said seal member in a vacuum chamber without hardening said seal member;

putting said panel under atmospheric pressure to deform said first spacers together with said liquid crystal through a deformation of said panel such that said deformation of said panel proceeds in a center portion of said panel at higher speed than that in a peripheral portion thereof due to a difference between atmospheric pressure and a negative pressure inside said panel, wherein said first spacers located at a central portion of said panel is deformed firstly together with said liquid crystal to provide an appropriate cell gap prior to said seal member being deformed; and hardening said seal member after an inner volume of said panel becomes equal to the volume of said liquid crystal, and wherein a relative value of an initial average size of said first spacers to said appropriate cell gap is within a range of 102.9% to 107.0%.

* * * * *